United States Patent
McDowell

(10) Patent No.: US 7,250,903 B1
(45) Date of Patent: Jul. 31, 2007

(54) GPS SPOOFER AND REPEATER MITIGATION SYSTEM USING DIGITAL SPATIAL NULLING

(75) Inventor: Charles E. McDowell, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 11/405,080

(22) Filed: Apr. 17, 2006

(51) Int. Cl.
*G01S 5/02* (2006.01)
*H04B 7/185* (2006.01)

(52) U.S. Cl. ............................. 342/357.02; 342/357.15
(58) Field of Classification Search ........... 342/357.02, 342/357.12, 357.15, 358
See application file for complete search history.

(56) References Cited

U.S. PATENT DOCUMENTS

| | | | |
|---|---|---|---|
| 5,557,284 A * | 9/1996 | Hartman | 342/357.03 |
| 5,952,968 A | 9/1999 | McDowell | |
| 5,990,831 A | 11/1999 | McDowell | |
| 6,421,000 B1 | 7/2002 | McDowell | |
| 6,933,885 B1 | 8/2005 | Stockmaster | |

* cited by examiner

*Primary Examiner*—Thomas H. Tarcza
*Assistant Examiner*—Fred H Mull
(74) *Attorney, Agent, or Firm*—Nathan O. Jensen; Kyle Eppele

(57) ABSTRACT

A system and method using a multi-element digital beamformer for detection and mitigation of spoofer and repeater threats to GPS that would not be addressed by baseline signal-to-noise (SNR) maximization algorithms is disclosed. GPS correlators and processing are applied to multiple beam outputs to detect and locate spoofer and repeater threats. In the beamformer processing, detected threats can be spatially nulled, even in the presence of traditional high power jamming, by modifying the normal sample covariance matrix to introduce synthetic nulls. A digital complex weighting system multiples each input channel by a complex (gain/phase) weight and adds the weighted channels together to form beams that the GPS receiver can use to reacquire the satellites in use without knowledge of platform attitude or the antenna manifold.

19 Claims, 1 Drawing Sheet

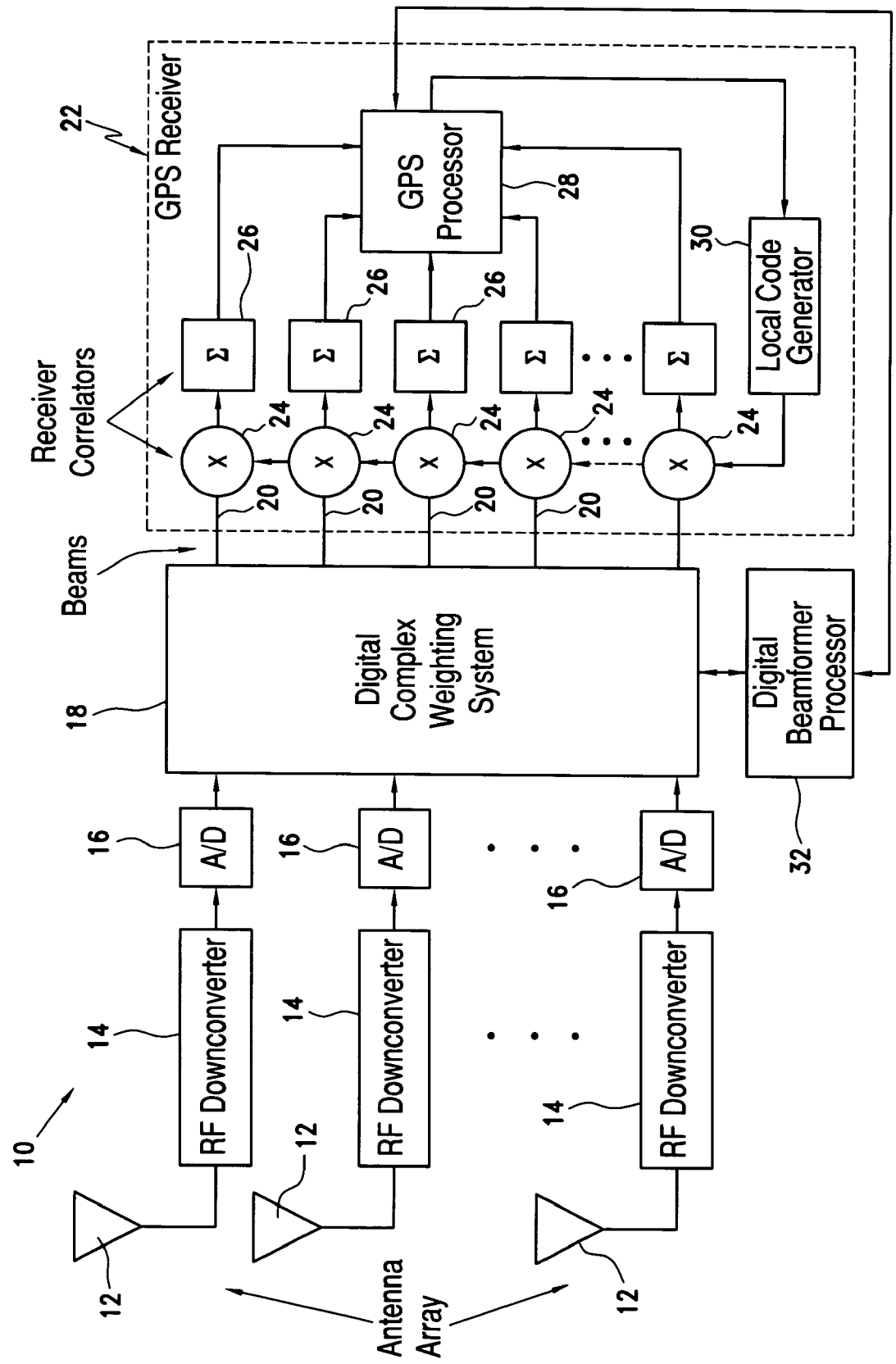

GPS SPOOFER AND REPEATER MITIGATION SYSTEM USING DIGITAL SPATIAL NULLING

BACKGROUND OF THE INVENTION

1. Field of the Invention

The present invention relates generally to techniques for reducing the effects of spoofers and repeaters in radio-frequency receivers and more specifically to methods and apparatus for enhancing the reception of global positioning system (GPS) signals in the presence of spoofers and repeaters signals.

2. Description of the Related Art

In recent years, multi-element antenna systems have proven themselves to be extremely effective at protecting GPS receivers from high power jamming. High dynamic range systems with digital back-end processing, such as those developed at Rockwell Collins, Inc., are capable of spatially nulling jamming signals by as much as 60 dB while simultaneously maintaining good antenna gain to desired signal sources.

Recently, however, there has been renewed interest in C/A code spoofers and repeaters (meaconers). A spoofer is a broadcast signal intended to look like a GPS satellite signal. The signal can fool the receiver into tracking it, but it will be unusable for navigation. This can result in either faulty navigation performance or the inability to achieve a navigation fix at all. The repeater case is slightly different in that the receiver itself may not ever be aware that anything is wrong. A repeater simply rebroadcasts the RF environment it receives, so the GPS receiver may derive a perfectly valid navigation solution. The problem is that the solution it derives is for the location of the repeater not the receiver itself. In some cases it may be obvious that something is wrong. If a coupled inertial system indicates a large velocity, for example, while the GPS solution indicates that the platform is stationary, a repeater threat may be suspected. Traditional spatial nulling systems are not always effective against spoofer and repeater threats because the signal levels may be too low to have any impact on the GPS signal-to-noise ratio (SNR). Spatial nulling systems are designed to optimize the SNR at their output without any special consideration to specific threat characteristics. The GPS signal itself will typically have an SNR of −30 dB, so a repeater or spoofer can be 20 dB or more above the GPS signal level without having any appreciable impact on the actual SNR of the GPS.

The present invention relates generally to techniques for mitigating spoofer and repeater threats to the GPS systems, and more specifically to methods and apparatus for detection and digital spatial nulling of spoofer and repeater threats to the GPS that would not be addressed by the baseline SNR maximization algorithms.

U.S. Pat. No. 6,421,000, issued to present applicant C. E. McDowell, entitled, "Method and Apparatus For Reducing Jamming By Beam Forming Using Navigational Data", discloses a method of signal error reduction in position systems such as the Global Positioning System (GPS), Global Navigation Satellite System (GLONASS), terrestrial or aircraft based pseudolytes, and the like, and more specifically to a method and apparatus for mitigating multipath signal distortion using a multi-element antenna array. The multi-element antenna array is used to discriminate between the directed signal and its multipath components based on spatial angle of arrival. A reference signal, provided by the positioning system receiver, is used to compute element weightings that are utilized to null out the multipath components before they reach the receiver.

U.S. Pat. No. 5,952,968, issued to present applicant C. E. McDowell, entitled, "Method and Apparatus For Reducing Jamming By Beam Forming Using Navigational Data," discloses a method of reducing jamming in a global positioning system (GPS) satellite receiving system that includes the steps of: a) selecting an initial weight value corresponding to each antenna element; b) selecting a weight adjustment scheme for adjusting the weights; c) measuring a power output from the antenna array; d) obtaining navigational data representing the orientation of the array; e) calculating for a gain of the antenna array corresponding each of the GPS satellites, using the navigational data to provide an indication of the orientation of the array relative to each GPS satellite; f) estimating a power level of a received signal corresponding to each GPS satellite; g) solving for the signal to noise ratio for each GPS satellite, using the estimated power level corresponding to each GPS satellite; h) iteratively and continuously adjusting the weights to obtain a greatest value of the signal to noise ratio; and i) continuously repeating steps (c) through (h).

U.S. Pat. No. 6,933,885, issued to Stockmaster, et al., entitled, "Miniaturized Digital GPS Anti-jam for Space and Size Constrained Applications," discloses a system for providing anti-jam protection that includes a two element antenna; a radio frequency downconverter providing an in phase and quadrature component of received signals by the two element antenna; and at least two analog to digital converters. The analog to digital converters are coupled to the radio frequency downconverter, wherein a first channel complex data and a second channel complex data formed from an output of each of the at least two analog to digital converters form a covariance matrix. A weight calculation is obtained from the covariance matrix providing optimal anti-jam suppression. The calculated weight for optimal anti-jam suppression is applied through hardware components.

U.S. Pat. No. 5,990,831, issued to present applicant C. E. McDowell, entitled, "FFT Implementation of Digital Antenna Array Processing In GNSS Receivers," discloses global navigation satellite system (GNSS) receivers, including digital spatial nulling arrays, and a method of providing antenna pattern outputs using the same. The digital spatial nulling array receives multiple antenna element inputs. A fast Fourier transform (FFT) is applied to the multiple antenna element inputs to obtain frequency domain representations of the multiple antenna element inputs. The antenna pattern outputs are provided by the spatial nulling array as a function of the frequency domain representations of the multiple antenna element inputs.

SUMMARY OF THE INVENTION

In a broad aspect, the present invention is global positioning system (GPS) spoofer and repeater mitigation system. A multi-element antenna array receives GPS L1/L2 RF signals. RF downconverters converts the L1/L2 RF signals to IF frequency analog signals suitable for analog-to-digital (A/D) conversion. A plurality of analog-to-digital (A/D) converters associated with the plurality of RF downconverters convert the IF frequency analog signals to digital signals. A digital complex weighting system (DCWS) multiplies each of the digital signals by a complex (gain/phase) weight and adds the weighted digital signals together to form a plurality of beams. The spoofer and repeater mitigation system includes a GPS receiver which comprises a plurality of receiver correlators, a GPS processor and a local code generator. The receiver correlators receive the plurality of beams and track them by correlating them with a local reference of a transmit code of the GPS. This correlating includes use of a GPS correlation process to generate the information necessary to derive the electronic angle of arrival to desired or undesired signals. A GPS processor receiver processes the output beams from the plurality of receiver correlators. The GPS processor includes the logic to detect a common electronic angle of arrival among multiple tracked satellites to detect spoofer and repeater threats. A local code generator receives a processed output from the GPS processor and provides a local code to the plurality of receiver correlators. A digital beamformer processor operatively connected to the DCWS and the GPS processor provides complex weights to the DCWS for creating the plurality of beams, and allows the introduction of synthetic nulls in the direction of spoofer and repeater threats. The DCWS, the GPS receiver and the digital beamformer processor cooperate to provide digital spatial nulling to mitigate GPS spoofer and repeater threats.

With no a priori knowledge of platform attitude or the antenna manifold the present invention allows the detection and spatial nulling of spoofer and repeater threats that would not be addressed by baseline signal-to-noise ratio (SNR) maximization algorithms.

BRIEF DESCRIPTION OF THE DRAWINGS

FIG. 1 illustrates a global positioning system (GPS) spoofer and repeater mitigation system in accordance with the principles of the present invention.

DETAILED DESCRIPTION OF THE INVENTION

Referring now to FIG. 1, a preferred embodiment of the global positioning system (GPS) spoofer and repeater mitigation system is illustrated, designated generally as 10. The spoofer and repeater mitigation system includes a multi-element antenna array for receiving GPS L1/L2 RF signals. The multi-element antenna array preferably includes seven elements 12, which is typical for airplanes.

A number of RF downconverters 14 convert the L1/L2 RF signals to IF frequency analog signals suitable for analog-to-digital (A/D) conversion. Analog-to-digital (A/D) converters 16 associated with the RF downconverters 14 convert the IF frequency analog signals to digital signals.

A digital complex weighting system (DCWS) 18 multiplies each of the digital signals by a complex (gain/phase) weight and adds the weighted digital signals together to form a plurality of beams 20. The DCWS typically generates 4-12 beams 20. However, it may generate more.

A GPS receiver, designated generally as 22, includes a plurality of receiver correlators for receiving the beams 20 and tracking them by correlating them with a local reference of a transmit code of the GPS. The receiver correlators include multipliers 24 and integrators 26. The correlating includes use of a GPS correlation process to generate the information necessary to derive the electronic angle of arrival to desired or undesired signals.

A GPS processor 28 processes the output beams from the receiver correlators 24, 26. The GPS processor includes logic to detect a common electronic angle of arrival among multiple tracked satellites, to detect repeaters.

A local code generator 30 receives a processed output from the GPS processor and provides a local code to the receiver correlators.

A digital beamformer processor 32 is operatively connected to the DCWS 18 and the GPS processor 28 for providing complex weights to the DCWS 18 for creating the plurality of beams 20, and for allowing the introduction of synthetic nulls in the direction of spoofer and repeater threats. The digital beamformer processor 32 loads the conjugate of the steering vector of the electronic angle of arrival to the selected satellite into the DCWS 18. As will be discussed below in more detail the DCWS 18, the GPS receiver 22 and the digital beamformer processor 28 cooperate to provide digital spatial nulling to mitigate GPS spoofer and repeater threats.

Thus, the operation of the system 10 of the present invention can be summarized by the following steps:

a) receiving GPS L1/L2 RF signals utilizing a multi-element antenna array 12;

b) converting the L1/L2 RF signals to IF frequency analog signals suitable for analog-to-digital (A/D) conversion utilizing a plurality of RF downconverters 14;

c) converting the IF frequency analog signals to digital signals utilizing a plurality of analog-to-digital (A/D) converters 16 associated with the plurality of RF downconverters 14;

d) multiplying each of the digital signals by a complex (gain/phase) weight and adding the weighted digital signals together to form a plurality of beams utilizing a digital complex weighting system (DCWS) 18;

e) receiving the plurality of beams and tracking them by correlating them with a local reference of a transmit code of the GPS utilizing a plurality of receiver correlators 24, the correlating including use of a GPS correlation process to generate the information necessary to derive the electronic angle of arrival to desired or undesired signals;

f) processing the output beams 20 from the plurality of receiver correlators 24, 26 utilizing a GPS processor 28, the GPS processor 28 including logic to detect a common electronic angle of arrival among multiple tracked satellites, to detect repeaters;

g) receiving a processed output from the GPS processor 28 and providing a local code to the plurality of receiver correlators 24, 26 utilizing a local code generator 30; and, h) providing complex weights to the DCWS 18 for creating the plurality of beams 20, and for allowing the introduction of synthetic nulls in the direction of spoofer and repeater threats utilizing a digital beamformer processor 32 operatively connected to the DCWS 18 and the GPS processor 28.

During operation, under unjammed conditions with no presence of spoofer or repeater threats, the step of multiplying each of the digital signals by a complex (gain/phase) weight and adding the weighted digital signals together to form a plurality of beams 20, involves configuring complex weights utilized by the DCWS 18 such that a separate beam 20 is generated for each of the antennas in the antenna array 12. The GPS correlation process and the GPS processor 28 derive a different phase/gain response from each the receiver correlator 24, 26. The GPS processor 28 constructs the steering vector utilizing the phase/gain for each beam 20. The digital beamformer processor 32 and the DCWS 18 load the conjugate of the steering vector into the complex weights for a beam 20 to maximize gain to the selected satellite.

During operation, under unjammed conditions with the potential presence of spoofer threats, the step of processing the output beams from the plurality of receiver correlators 24, 26 utilizing the GPS processor 28, the GPS processor 28 including logic to detect a common electronic angle of arrival among multiple tracked satellites, to detect spoofers, involves the step of determining the potential presence of spoofer threats after repeated acquisition failures. The digital beamformer processor 32 is configured such that a beam 20 is dedicated to each antenna element 12 of the antenna array. Thus, the GPS receiver 22 can correlate each beam 20 with the strongest receive signal. The GPS processor 28 utilizes the beam 20 information to generate complex weights that form a null in the specified direction. The digital beamformer processor 32 gets the complex weights from the GPS processor 28 and loads them to the DCWS 18. The DCWS 18 then utilizes the complex weights to at least one beam 20 which the GPS receiver 22 can use for acquisition.

During operation, under jammed conditions with the potential presence of spoofer threats, the step of multiplying each of the digital signals by a complex (gain/phase) weight and adding the weighted digital signals together, involves a step of solving the steering vector based on the complex weights used and the output beams 20 from the receiver correlators 24, 26, and creating a synthetic null to null out both the jamming signal and the spoofer threats by modifying a covariance matrix normally used to generate the weights to null out the undesired jamming signal.

During operation, under conditions with the potential presence of repeater threats, the step of receiving the beams 20 and tracking them by correlating them with a local reference of a transmit code of the GPS utilizing the receiver correlators 24, 26, involves the step of constantly configuring the steering vectors to the satellites in use to maximize received GPS signals by utilizing the digital beamforming processor 32, and determining the potential presence of repeater threats when the steering vector to all (or most) of the satellites are the same within some tolerance, which indicates the transmit signals are not spatially separated as they must be when broadcast from true GPS satellites by utilizing the digital beamforming processor 32. A synthetic null to null out the repeater in the presence of a jamming signal is created by modifying a covariance matrix normally used to generate the weights to null out the undesired jamming signal utilizing the digital complex weighting system (DCWS) 18, the digital beamformer processor 32 and the GPS receiver 22. Thus, the GPS receiver 22 reacquires the real satellites in use.

Other embodiments and configurations may be devised without departing from the spirit of the invention and the scope of the appended claims.

The invention claimed is:

1. A global positioning system (GPS) spoofer and repeater mitigation system, comprising:
   a) a multi-element antenna array for receiving GPS L1/L2 RF signals;
   b) a plurality of RF downconverters for converting said L1/L2 RF signals to IF frequency analog signals suitable for analog-to-digital (A/D) conversion;
   c) a plurality of analog-to-digital (A/D) converters associated with said plurality of RF downconverters for converting said IF frequency analog signals to digital signals;
   d) a digital complex weighting system (DCWS) for multiplying each of said digital signals by a complex (gain/phase) weight and adding the weighted digital signals together to form a plurality of beams;
   e) a GPS receiver, comprising:
      i. a plurality of receiver correlators for receiving said plurality of beams and tracking them by correlating them with a local reference of a transmit code of the GPS, said correlating including use of a GPS correlation process to generate the information necessary to derive the electronic angle of arrival to desired or undesired signals;
      ii. a GPS processor for processing the output beams from said plurality of receiver correlators, said GPS processor including logic to detect a common electronic angle of arrival among multiple tracked satellites, in order to detect repeaters; and,
      iii. a local code generator for receiving a processed output from said GPS processor and providing a local code to said plurality of receiver correlators; and,
   f) a digital beamformer processor operatively connected to said DCWS and said GPS processor for providing complex weights to said DCWS for creating said plurality of beams, and for allowing the introduction of synthetic nulls in the direction of spoofer and repeater threats,
   wherein said DCWS, said GPS receiver and said digital beamformer processor cooperate to provide digital spatial nulling to mitigate GPS spoofer and repeater threats.

2. The GPS spoofer and repeater mitigation system of claim 1, wherein said digital complex weighting system (DCWS), comprises:
   a) means for providing a normal antijam processing capacity by creating a covariance matrix to null non-spoofer and/or non-repeater (high power) jamming threats; and,
   b) means for modifying said normal antijam processing capacity to create a synthetic null by modifying said covariance matrix normally used to generate the weights thereby nulling the spoofer in the presence of jamming, said synthetic covariance matrix being scaled appropriately to ensure that the spoofer, repeater and existing high power jammers will be nulled.

3. The GPS spoofer and repeater mitigation system of claim 1, wherein said receiver correlators comprise a plurality of multipliers and integrators.

4. The GPS spoofer and repeater mitigation system of claim 1, wherein said multi-element antenna array comprises seven antenna elements.

5. The GPS spoofer and repeater mitigation system of claim 1, wherein said DCWS generates 4-12 of said beams.

6. The GPS spoofer and repeater mitigation system of claim 1, wherein under unjammed conditions said complex weights utilized by said DCWS are configured such that a separate beam is generated for each of the antennas in said antenna array, said GPS receiver correlating the same satellite local code reference against each beam resulting in a different phase/gain response from each receiver correlator, thus providing a steering vector, said steering vector being said electronic angle of arrival to a selected satellite, wherein loading the conjugate of said steering vector into said complex weights for a beam maximizes gain to the selected satellite.

7. The GPS spoofer and repeater mitigation system of claim 1, wherein:
   a) under unjammed conditions said complex weights utilized by said DCWS are configured such that a separate beam is generated for each of the antenna elements in said antenna array, said GPS receiver correlating the same satellite local code reference against each beam resulting in a different phase/gain response from each receiver correlator, thus providing a steering vector, said steering vector being said electronic angle of arrival to a selected satellite, wherein loading the conjugate of said steering vector into said complex weights for a beam provides maximum gain to the selected satellite;

b) said digital beamformer processor is configured so that after repeated acquisition failures, indicating the potential presence of a spoofer threat, a beam is dedicated to each antenna element wherein said GPS receiver can correlate each beam with the strongest receive signal, feeding the information to said GPS processor which uses it to generate said complex weights that form a null in the specified direction, said complex weights then being applied to at least one beam which said GPS receiver can use for acquisition; and, c) under the potential presence of jamming, said steering vector is solved based on said complex weights used and said output beams from said plurality of receiver correlators, and a synthetic null to null out both jamming signal and spoofer threats is created by modifying a covariance matrix normally used to generate the weights to null out the undesired jamming signal.

8. The GPS spoofer and repeater mitigation system of claim 1, wherein under the potential presence of a repeater threat said digital beamformer processor is configured to constantly derive steering vectors to the GPS satellites in use to maximize received signal gain, determining the presence of a repeater when the steering vectors to all (or most) of the satellites are the same within a defined tolerance, which indicates the transmit signals are not spatially separated as they must be when broadcast from true GPS satellites, and a synthetic null is created to null out the undesired signal from the repeater, thus said GPS receiver can reacquire the real satellites.

9. A method for mitigating spoofer and repeater threats in a global positioning system (GPS), comprising the steps of:

a) receiving GPS L1/L2 RF signals utilizing a multi-element antenna array;

b) converting said L1/L2 RF signals to IF frequency analog signals suitable for analog-to-digital (A/D) conversion utilizing a plurality of RF downconverters;

c) converting said IF frequency analog signals to digital signals utilizing a plurality of analog-to-digital (A/D) converters associated with said plurality of RF downconverters;

d) multiplying each of said digital signals by a complex (gain/phase) weight and adding the weighted digital signals together to form a plurality of beams utilizing a digital complex weighting system (DCWS);

e) receiving said plurality of beams and tracking them by correlating them with a local reference of a transmit code of the GPS utilizing a plurality of receiver correlators, said correlating including use of a GPS correlation process to generate the information necessary to derive the electronic angle of arrival to desired or undesired signals;

f) processing the output beams from said plurality of receiver correlators utilizing a GPS processor, said GPS processor including logic to detect a common electronic angle of arrival among multiple tracked satellites, to detect repeaters;

g) receiving a processed output from said GPS processor and providing a local code to said plurality of receiver correlators utilizing a local code generator; and, h) providing complex weights to said DCWS for creating said plurality of beams, and for allowing the introduction of synthetic nulls in the direction of spoofer and repeater threats utilizing a digital beamformer processor operatively connected to said DCWS and said GPS processor, wherein said DCWS, said GPS receiver and said digital beamformer processor cooperative to provide digital spatial nulling to mitigate GPS spoofer and repeater threats.

10. The method for mitigating spoofer and repeater threats of claim 9, wherein said step of multiplying each of said digital signals by a complex (gain/phase) weight and adding the weighted digital signals together, comprises the steps of:

a) providing a normal antijam processing capacity by creating a covariance matrix to null non-spoofer and/or non-repeater (high power) jamming threats utilizing said digital complex weighting system (DCWS); and, b) modifying said normal antijam processing capacity to create a synthetic null by modifying said covariance matrix normally used to generate the weights thereby nulling the spoofer in the presence of jamming utilizing said digital complex weighting system (DCWS), said synthetic covariance matrix being scaled appropriately to ensure that the spoofer, repeater and existing high power jammers will be nulled.

11. The method for mitigating spoofer and repeater threats of claim 9, wherein said step of receiving said plurality of beams and tracking them by correlating them with a local reference of a transmit code of the GPS comprises the step of multiplying and integrating said beams generated by said digital complex weighting system (DCWS) utilizing said plurality of receiver correlators.

12. The method for mitigating spoofer and repeater threats of claim 9, wherein under unjammed conditions with no presence of spoofer or repeater threats, said step of multiplying each of said digital signals by a complex (gain/phase) weight and adding the weighted digital signals together to form a plurality of beams, comprises the step of configuring complex weights utilized by said DCWS such that a separate beam is generated for each of the antennas in said antenna array.

13. The method for mitigating spoofer and repeater threats of claim 9, wherein under unjammed conditions with no presence of spoofer or repeater threats, said step of receiving said plurality of beams and tracking them by correlating them with a local reference of a transmit code of the GPS utilizing a plurality of receiver correlators, comprises the steps of:

a) deriving a different phase/gain response from each said receiver correlator utilizing said GPS correlation process and said GPS processor;

b) constructing said steering vector utilizing said phase/gain for each said beam utilizing said GPS processor; and, c) loading the conjugate of said steering vector into said complex weights for a beam to maximize gain to the selected satellite utilizing said digital beamformer processor and said DCWS.

14. The method for mitigating spoofer and repeater threats of claim 9, wherein under unjammed conditions with the potential presence of spoofer threats, said step of processing the output beams from said plurality of receiver correlators utilizing a GPS processor, said GPS processor including logic to detect a common electronic angle of arrival among multiple tracked satellites, to detect repeaters, comprises the step of determining the potential presence of spoofer threats after repeated acquisition failures.

15. The method for mitigating spoofer and repeater threats of claim 9, wherein under unjammed conditions with the potential presence of spoofer threats, said step of providing complex weights to said DCWS for creating said plurality of beams, and for allowing the introduction of synthetic nulls in the direction of spoofer and repeater threats utilizing a digital beamformer processor operatively connected to said DCWS and said GPS processor, comprises the steps of:
  a) configuring said digital beamformer processor such that a beam is dedicated to each antenna element wherein said GPS receiver can correlate each beam with the strongest receive signal; and,
  b) feeding the information to said GPS processor which uses it to generate said complex weights that form a null in the specified direction.

16. The method for mitigating spoofer and repeater threats of claim 9, wherein under unjammed conditions with the potential presence of spoofer threats, said step of multiplying each of said digital signals by a complex (gain/phase) weight and adding the weighted digital signals together to form a plurality of beams utilizing a digital complex weighting system (DCWS), comprises the step of applying said complex weights to at least one beam which said GPS receiver can use for acquisition.

17. The method for mitigating spoofer and repeater threats in a global positioning system (GPS) of claim 9, wherein under jammed conditions with the potential presence of spoofer threats, said step of multiplying each of said digital signals by a complex (gain/phase) weight and adding the weighted digital signals together, comprises the steps of:
  a) solving said steering vector based on said complex weights used and said output beams from said plurality of receiver correlators; and,
  b) creating a synthetic null to null out the jamming signal and spoofer threats by modifying a covariance matrix normally used to generate the weights to null out the jamming.

18. The method for mitigating spoofer and repeater threats of claim 9, wherein under conditions with the potential presence of repeater threats, said step of receiving said plurality of beams and tracking them by correlating them with a local reference of a transmit code of the GPS utilizing a plurality of receiver correlators, comprises the steps of:
  a) constantly configuring said steering vectors to the satellites in use to maximize received GPS signals by utilizing said digital beamforming processor; and,
  b) determining the potential presence of repeater threats when said steering vector to all (or most) of the satellites are the same within some tolerance, which indicates the transmit signals are not spatially separated as they must be when broadcast from true GPS satellites, by utilizing said digital beamforming processor.

19. The method for mitigating spoofer and repeater threats of claim 9, wherein under conditions with the potential presence of repeater threats, said step of multiplying each of said digital signals by a complex (gain/phase) weight and adding the weighted digital signals together, comprises the steps of:
  a) creating a synthetic null to null out the repeater in the presence of jamming by modifying a covariance matrix normally used to generate the weights to null out the undesired jamming signal utilizing said digital complex weighting system (DCWS), said digital beamformer processor and said GPS receiver; and,
  b) reacquiring the real satellites utilizing said GPS receiver.

* * * * *